Feb. 27, 1962  S. CIRAMI  3,023,045
ONE-PIECE VEHICLE BODY
Original Filed Oct. 21, 1958
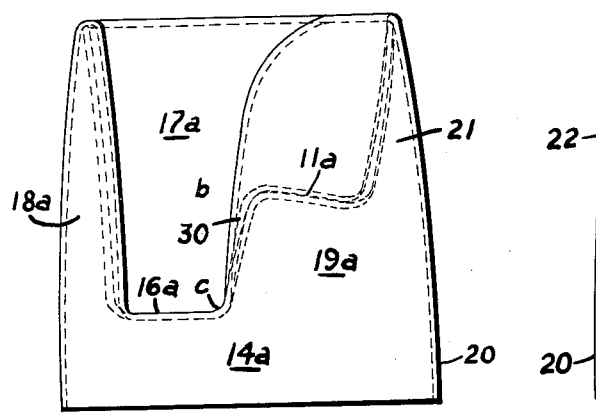
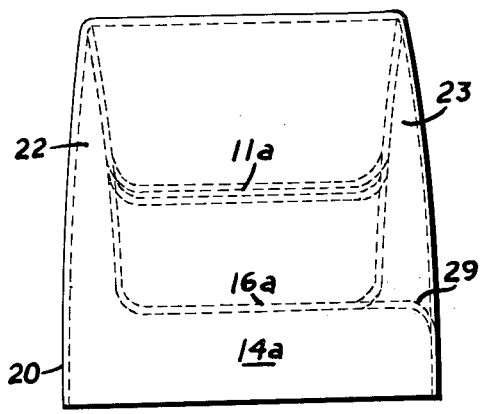
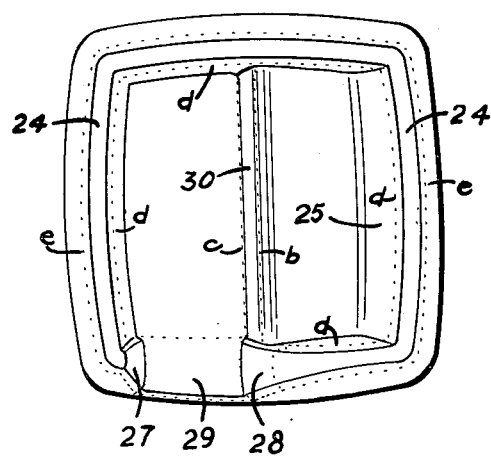
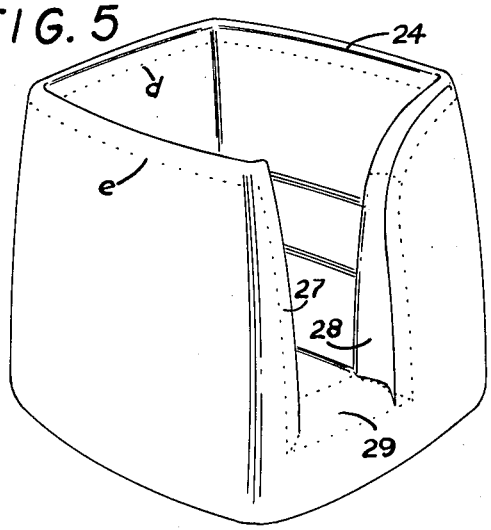
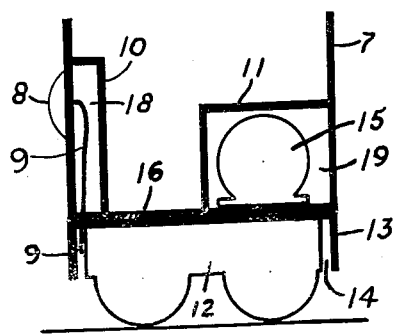
INVENTOR.
Salvatore Cirami

United States Patent Office 3,023,045
Patented Feb. 27, 1962

3,023,045
ONE-PIECE VEHICLE BODY
Salvatore Cirami, 75—36 Parsons Blvd.,
Flushing 67, N.Y.
Original application Oct. 21, 1958, Ser. No. 768,793. Divided and this application Jan. 15, 1960, Ser. No. 2,608
2 Claims. (Cl. 296—31)

This invention is a one-piece double-walled reinforced plastic vehicle body that provides in combination: a compartment of human passenger carrying capacity, with a floor, seat and encircling walls; compartments under same to house motor and drive elements; and, compartments between interior and exterior walls to pass electrical wiring while shielding occupants from same—all in a single molding. It is a division of application Serial Number 768,793 for Robot Amusement Ride, filed October 21, 1958.

The main object is to provide a one-piece vehicle body for the containment of humans, that affords in a single molding operation: a passenger compartment with a floor, seat and completely encircling walls (except for a narrow entranceway); a motor housing compartment under the seat to conceal the vehicle's motor; compartments surrounding the passenger compartment, for the shielded passage of wiring to every part of the body; a chassis compartment under the floor for concealing the vehicle's forward-advancing means; and, an entranceway into the passenger compartment; through the use of reinforced plastic in a double-walled design.

A second object is to provide this vehicle body with interior walls inclined outwardly from the floor, and exterior walls inclined outwardly from the top of the body: to increase strength by leaning the walls one against the other; to increase stability through a pyramidal silhouette; and, to provide the seat with a sloped back.

Another object is to provide this vehicle body with bowed out walls: to further increase strength through a more spherical shape; increase comfort by complementing the human shape; and, to improve styling.

Still another object is to provide this vehicle body with sweeping curves and well-rounded corners inside and out: to maximize rigidity through compound curves and minimal wall area; for safety through elimination of sharp corners and edges; to provide a cleaner body free of corners and hard-to-get-at places where dirt accumulates; and, to further improve appearance.

And finally, it is a special object to provide a compact molded body, with inside to outside proportions comparable to conventional box-like structures.

FIG. 1 is a diagram symbolizing the construction of most carnival ride bodies.

FIG. 2 is a side elevation of the improved vehicle body, with internal form indicated by dashed lines.

FIG. 3 is a front elevation of same, with internal form indicated by dashed lines.

FIG. 4 is a top elevation of same, with dotted lines superficially dividing the body into sections, for descriptive purposes.

FIG. 5 is a three-quarter perspective view, again with dotted lines dividing the body into sections for descriptive purposes.

Typical, carnival ride body construction involves the assembly of a variety of parts each having required a multitude of manufacturing operations in its preparation. The machining of these pieces and their joining together into a finished product is always a time-consuming, expensive process; but is particularly so when only a few bodies are needed and the savings of mass production are inapplicable.

In this industry a limited number of a wide variety of bodies are provided by skilled craftsmen working many working hours to cut, fit; and screw, weld, and rivet together a battery of pieces and parts. The prohibitive cost of bodies made this way was a handicap in Robot-Ride, where a vehicle with a comparatively complex mode of operation must compete (for the new equipment purchasing dollar) with rides conceived around simple wheeled vehicles; and with rides where passengers are merely carried around on the perimeter of a pinwheel. Construction of this body according to prevailing "House-That-Jack-Built" principles would increase the necessity of pricing the ride out of a position competitive with those simpler machines. To minimize this danger I sought an inexpensive body, equal in strength to types constructed of sheet material added to a skeletal framework; or plates welded at corners or reinforced with additional pieces.

The answer seemed to lie with molded fiber glass, but a box-like body made by low cost hand-layup methods presents a coarse textured side: unattractive if on the outside, and uncomfortable and liable to bruise occupants if on the inside. Further, the Robot-Ride body has lamps installed on its front wall, and decorative arms attached to its side walls. Wiring must be passed to the lamps, and fastening devices must protrude inwardly from the arms. For safety and comfort, passengers must be shielded from these elements. Usually this is done with upholstering, or additional interior paneling—and the cost skyrockets again. The picture gets even more complicated when you consider that a seat must be provided in the box, compartments under the box to conceal a motor and forward-advancing means, and an entrance-way for access into the box. I found that all these ends could be achieved by turning the box upside down—in effect—and shaping it a certain way.

The construction of amusement vehicle bodies of FIG. 1 may be summarized: Build a box 7; attach accessories 8; if the accessory is electrically powered, cover the wiring 9 with a shield 10; put a seat 11 in the box and set the whole thing on a chassis 12. To conceal the chassis, build an enclosure 13, forming a chassis compartment 14. If a motor 15 is used, install it under the seat. Then, cut holes in the floor 16 to connect the motor with the chassis and to pass the wiring to a power source. The inevitable result of this approach is costly complexity.

Referring still to FIG. 1, a passenger compartment 17 with a floor and seat; a wiring compartment 18; a motor housing compartment 19; and a chassis compartment 14 can all be provided in a single molding operation—if the body is designed as in FIG. 2, where corresponding parts are identified by the same numerals followed by a small "a."

An extension 20, FIGS. 2, 3 of the exterior walls provides the chassis compartment 14a. In addition to the wiring compartment at 18a, compartments are provided at 21, FIG. 2 and at 22, 23, FIG. 3. Through these surrounding compartments wiring can be routed and rerouted to any part of the body with passenger safety assured; and decorative attachments may be appended to the exterior walls without the need for bolt heads or other fastening devices protruding through the interior walls into the passenger compartment. Since the chassis compartment is contiguous with the motor housing and all the wiring compartments, the need to cut connecting holes is eliminated.

The interior walls are inclined outwardly from the floor, and the exterior walls are inclined outwardly from the shoulder 24, FIG. 4. The angle is great enough to increase the strength of the structure by leaning the walls one against the other; so that the relationship (in the case of this cubical body) is like a flat-topped pyramid inverted in an upright pyramid. This angle is great enough, also, to provide the seat with a comfortably sloped back 25.

The shoulder 24, FIG. 4 is part of a channel that is contiguous at its inboard side (d) with the upper end of the interior walls, and dips at the entranceway 26, FIG. 5 to provide door jambs 27, 28 and a door sill 29, FIGS. 4, 5. This channel is contiguous at its outboard side (e) with the exterior walls. Because the channel is narrow at the shoulder, the inward leaning exterior walls can be wrapped closely around the interior walls, and a compact body is attained with cube-like exterior proportions, and inside to outside proportions comparable to conventional box-like structures.

Rounding the body everywhere, increases strength by eliminating weak corners and minimizing total wall area. Strength is maximized by bowing the walls outward in a horizontal plane, FIG. 4, and in a vertical plane, FIGS. 2, 3 to stiffen walls through a purposeful use of compound curves to approximate part spherical surfaces. In addition, hard-to-clean corners are eliminated, a pleasing design attained FIG. 5, and a smooth surface presented inside and out: eliminating the need for further finishing or interior upholstering.

The partial floor 16a is joined at its rearward end (c) to a panel 30, which in turn is joined to the forward end (b) of the seat. The floor is made flush with the door sill 29, FIG. 3; and the door sill rounded to avoid a corner on which boarders might trip.

The lightness of this body is particularly important in Robot-Ride, where a walking mechanism must lift the vehicle each time it takes a step. The less the weight, the smaller the motor needed, and the more economically the ride can be operated. Carnival rides in portable operations are constantly moved from one part of the country to another; and in the initial sale, the ride often must be shipped a considerable distance to reach the purchaser. The one-piece fiber glass body will markedly reduce the overall weight of these rides, and with it, the freight and handling costs.

Since these rides are constantly being kicked or otherwise abused by riders and are liable to set-up, take-down and transportation damage; the resiliency of the plastic is a special advantage.

Also important, is the non-corrosiveness of this all-plastic body: since amusement parks are frequently located near the ocean and in those installations the body is continuously exposed to a salt atmosphere.

To facilitate passenger entry, the rearward door jamb is arced backward to flow smoothly into the shoulder.

I claim:

1. A one-piece double-walled reinforced plastic vehicle body of human passenger carrying capacity, comprising: an open-top passenger compartment with completely encircling interior walls except for a narrow entranceway; a partial floor set forward in said compartment and contiguous with the forward and side walls; a seat set aft in the compartment and contiguous with the side and aft walls; a panel extending from the forward end of the seat to the rearward end of the floor, and contiguous at the sides with the side walls; said seat so positioned in height above the floor that passengers seated on same will be head and shoulders above the encircling walls; said entranceway situated forward of said panel and extending from the top of said walls clear to the floor; a channel contiguous at its inboard side with the upper edges of said walls and dipping to coincide with the entrance opening, to form a shoulder, door jambs, and a door sill; and, exterior encircling walls contiguous with and depending from the outboard side of said channel; said exterior walls adjacent to but spaced apart from said interior walls and extending downward below the level of said floor—providing in combination in a single molding operation: a passenger compartment with a floor, seat, encircling walls, and an entranceway; a motor housing compartment under the seat contiguous with a chassis compartment under the floor; and, wiring compartments forward, on either side, and aft of the passenger compartment.

2. A one-piece double-walled reinforced plastic vehicle body of human passenger carrying capacity, comprising: an open-top passenger compartment with completely encircling interior walls except for a narrow entranceway; a partial floor set forward in said compartment and contiguous with the forward and side walls; a seat set aft in the compartment and contiguous with the side and aft walls; a panel extending from the forward end of the seat to the rearward end of the floor, and contiguous at the sides with the side walls; said seat so positioned in height above the floor that passengers seated on same will be head and shoulders above the encircling walls; said entranceway situated forward of said panel and extending from the top of said walls clear to the floor; a channel contiguous at its inboard side with the upper edges of said walls and dipping to coincide with the entrance opening, to form a shoulder, door jambs, and a door sill; exterior encircling walls contiguous with and depending from the outboard side of said channel and extending downward below the level of said floor; said interior walls inclined outwardly from the floor, and the exterior walls inclined outwardly from the shoulder, to maximize strength by leaning the walls one against the other; said interior and exterior walls and the connecting channel bowed outward in a horizontal plane, and all intersections of surfaces inside and out, given maximum curvature so that one flows gradually into the other, and with a compound curvature in the interior and exterior walls to maximize strength by minimizing total wall area and by approximating part spherical surfaces—providing in a single molding operation: a passenger compartment with a floor, seat, encircling walls and an entranceway; a motor housing compartment under the seat contiguous with a chassis compartment under the floor; and, wiring compartments forward, on either side, and aft of the passenger compartment.

References Cited in the file of this patent

UNITED STATES PATENTS

| | | |
|---|---|---|
| 2,814,524 | Porsche et al. | Nov. 26, 1957 |
| 2,876,037 | Ingolia et al. | Mar. 3, 1959 |
| 2,883,233 | Beckley | Apr. 21, 1959 |